United States Patent
Wade

(10) Patent No.: US 7,048,849 B2
(45) Date of Patent: May 23, 2006

(54) FIRST FLUSH RAINWATER DIVERTER AND COLLECTION SYSTEM

(76) Inventor: Rodney George Wade, 148 Wongawallen Drive, Upper Coomera, Queensland, 4210 (AU)

( * ) Notice: Subject to any disclaimer, the term of this patent is extended or adjusted under 35 U.S.C. 154(b) by 113 days.

(21) Appl. No.: 10/689,056

(22) Filed: Oct. 21, 2003

(65) Prior Publication Data
US 2005/0082211 A1   Apr. 21, 2005

(51) Int. Cl.
*E03B 3/02* (2006.01)
(52) U.S. Cl. .............. 210/154; 210/170; 210/532.1; 220/219; 220/501; 137/122
(58) Field of Classification Search .......... 210/154, 210/163, 170, 521, 538, 532.1; 220/216, 220/219, 501, 565; 137/120, 122
See application file for complete search history.

(56) References Cited

U.S. PATENT DOCUMENTS

| 549,835 | A | * | 11/1895 | Van Benthusen | 137/120 |
| 4,219,428 | A | * | 8/1980 | Soderstroom | 210/532.1 |
| 4,578,188 | A | * | 3/1986 | Cousino | 210/532.1 |
| 5,114,594 | A | * | 5/1992 | Rosebrock et al. | 210/154 |
| 5,407,091 | A | * | 4/1995 | Wallis | 220/216 |
| 5,433,845 | A | * | 7/1995 | Greene et al. | 210/170 |
| 5,498,331 | A | * | 3/1996 | Monteith | 210/170 |
| 5,746,911 | A | * | 5/1998 | Pank | 210/532.1 |
| 5,849,181 | A | * | 12/1998 | Monteith | 210/170 |
| 6,062,767 | A | * | 5/2000 | Kizhnerman et al. | 210/170 |
| 6,068,765 | A | * | 5/2000 | Monteith | 210/170 |
| 6,182,680 | B1 | * | 2/2001 | Hart | 137/122 |

FOREIGN PATENT DOCUMENTS

| AU | 16551/95 B | | 11/1995 |
| JP | 9-41429 | * | 2/1997 |
| JP | 10-88629 | * | 4/1998 |

* cited by examiner

*Primary Examiner*—Christopher Upton
(74) *Attorney, Agent, or Firm*—Millen, White, Zelano & Branigan, P.C.

(57) ABSTRACT

A first flush rainwater diverter and collection system for use with rainwater storage tanks primarily in domestic situations. The system comprises primary (13) and secondary (14) storage chambers, a T-piece (10) for connection in a rainwater flow path, a fall pipe (12) connected to the T-piece and extending into the primary storage chamber, a float within the fall pipe which seals on a seat when the level of rainwater reaches a preset level, a rainwater flow regulator (17) which regulates the flow of rainwater from the primary storage chamber to the secondary storage chamber, an overflow (18) and an outlet (19) in the secondary storage chamber.

8 Claims, 1 Drawing Sheet

FIRST FLUSH RAINWATER DIVERTER AND COLLECTION SYSTEM

BACKGROUND OF THE INVENTION

Figure 1:
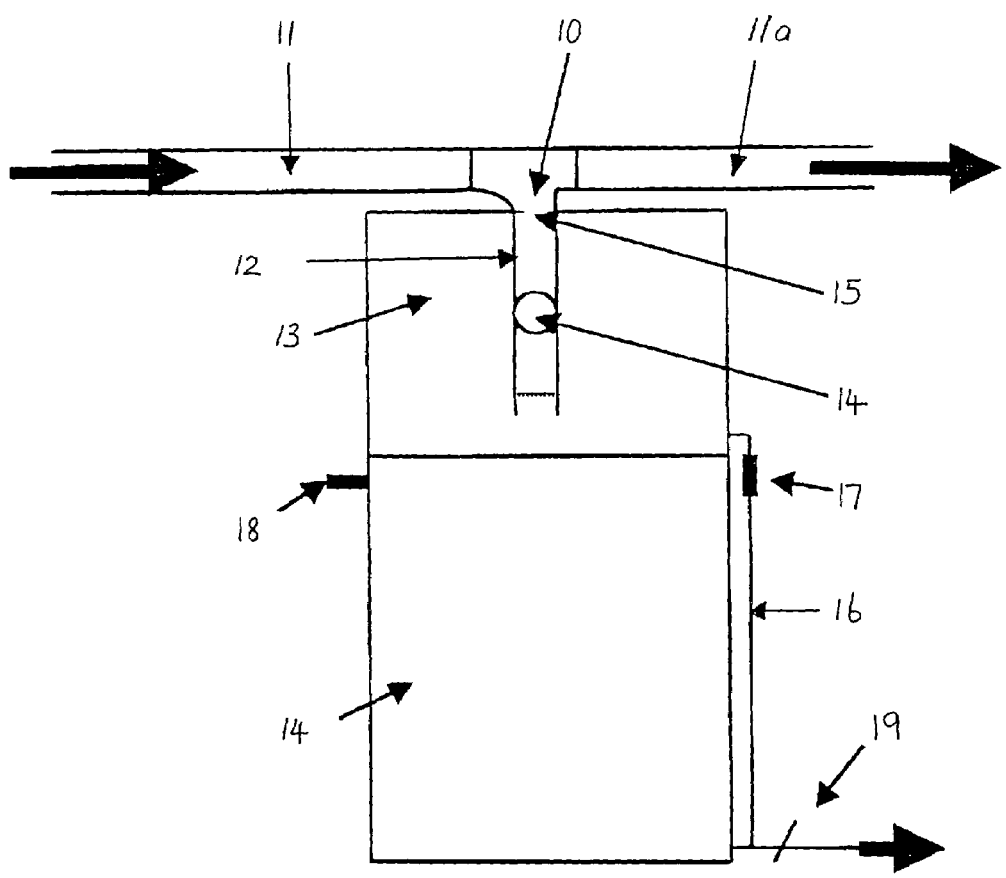

This invention relates to a first flush rainwater diverter and collection system, that is, a system for separating and storing an initial flow of normally contaminated rainwater flowing from a catchment region, such as the roof of a building, to a storage region, such as a large capacity tank. The invention is a further development of the invention described in Australian Patent No. 692835.

In the aforementioned patent, there is disclosed a rainwater diverter comprising a T-piece with associated rainwater fall pipe. The T-piece is adapted for connection in the rainwater flow path to intercept the flow of rainwater flowing into a downpipe or directly to a storage or usage area. The fall pipe incorporates a ball-float which seals on a seat when the fall pipe is at least partly full of water, an outlet which limits the rate of flow from the fall pipe in comparison with the maximum flow of rainwater which can enter the fall pipe by way of the T-piece connection, and means enabling solid contaminants to be removed from the fall pipe.

Such a diverter system has been shown by studies conducted by the University of Sydney to be very effective for separating the initial flow of contaminated rainwater from the rainwater flow path.

In many instances, it is desirable to retain the contaminated diverted rainwater for other uses, for instance for application to a domestic garden or the like. This has lead to a modification of the fall pipe in the above-mentioned invention whereby it opens directly into a secondary storage chamber and the outlet is relocated to a suitable position, usually in the base of the secondary storage container. For above ground systems, the outlet typically has a control valve which allows a pre-set flow to continuously drain off and when the rain stops the chamber empties. For underground systems, an automatic sump pump is provided that will typically operate a sprinkler system, or pump directly to a waste drain at a preset time after rain. Both systems effectively operate to completely empty the secondary storage chamber after a set period of time. This can result in a wastage of water. There has consequently been consumer demand for a system which will store the diverted rainwater for later use.

OBJECT OF THE INVENTION

It is therefore an object of the invention to provide a first flush rainwater diverter and collection system which willenable storage of a predetermined quantity of diverted rainwater but shut off the flow to the storage region when a pre-set volume of rainwater has passed the ball float.

SUMMARY OF THE INVENTION

According to the present invention there is provided a first flush rainwater diverter and collection system comprising primary and secondary storage chambers, a T-piece for connection in a rainwater flow path, a fall pipe connected to the T-piece and extending into the primary storage chamber, said fall pipe including a float which seals on a seat when the level of rainwater within the fall pipe reaches a preset level, a rainwater flow regulator which regulates the flow of rainwater from the primary storage chamber to the secondary storage chamber, an overflow in the secondary storage chamber and an outlet for draw-off of rainwater as required from the secondary storage chamber.

DESCRIPTION OF THE INVENTION

The effective volume of the primary chamber is related to the size of the rainwater catchment area and the degree of contamination so that diversion and storage of essentially only the contaminated portion of the rainwater results. An Industry Development Standard requires the collection of 0.5 mm over the catchment area where light contamination occurs and up to approximately 2.0 mm where heavy contamination occurs such-as from roofs with fruit bat droppings.

The "effective volume" of the primary chamber is the volume to which the rainwater can rise before the float seals off the admission of further rainwater. The effective volume can be adjusted by altering the float.

For instance when the float comprises a ball, adjustment can be readily achieved by adding one or more additional balls to the fall pipe. Each ball added will lower the cut-off level of the rainwater in the primary chamber and thereby reduce the volume of rainwater necessary to seal the primary chamber against the admission of further rainwater. For instance, if the primary chamber was 600 mm deep and held 150 litres of rainwater when a single ball float was in place, the effective volume would be reduced by 25 litres if a second ball float having a diameter of 100 mm was added.

Preferably, the secondary chamber is located immediately below the primary chamber and is between about two and three times the capacity of the primary chamber so as to retain a reasonable amount of rainwater before the rainwater overflows to waste. Thus, for instance, with a primary chamber capacity of 150 litres fitted with a flow control valve to the secondary chamber that permitted a maximum flow of 3 litres per hour and a secondary chamber capacity of 400 litres, no rainwater would be lost from the overflow of the secondary chamber until it has rained continuously for 83 hours.

In most circumstances when operating on a maximum 150 litres diversion, the secondary chamber would hold two diversions over a total rail period of 35 hours which is an extraordinary long rain period for the majority of Australia.

The first flush rainwater diverter and collection system according to the present invention can be suitably designed to sit on the ground alongside a conventional rainwater supply tank with the flow of decontaminated water through the T-piece being arranged at a convenient height to enter the inlet screen of the rainwater supply tank.

The system caters for all know possible failures and is fail safe which means that if the secondary chamber is not drained off for normal irrigation, the system will still function. The rainwater will gravitate from the primary chamber into the secondary chamber until it is full and then escape by way of the secondary chamber overflow.

A vector proof screen can be fitted to the secondary chamber overflow to comply with State legislation.

DESCRIPTION OF PREFERRED EMBODIMENT

A preferred embodiment of the invention will now be described with reference to the accompanying drawing, FIG. 1, which is a schematic side-on cross-sectional view of the system.

The system consists of a T-piece 10 in a rainwater flow line 11, 11a passing from a catchment region to a water storage area, wherein the direction of rainwater flow is shown by the heavy arrows.

The T-piece 10 is connected to a fall pipe 12 which extends into a primary chamber 13. The fall pipe 12 includes a ball float valve 14 and a seat 15.

The primary chamber 13 is located atop a secondary chamber 14 and fluid communication between the chambers is by way of fluid line 16 and flow regulator valve 17.

An overflow 18 to waste is located in the top of the secondary chamber and a tap discharge 19 is located in the bottom.

In operation, rainwater from the catchment region passes along the flow line 11 and is initially diverted by the T-piece 10 into the primary chamber 13.

The primary chamber 13 has an effective volume which correlates with the area of the catchment and the degree of contamination thereof so that when the primary chamber 13 is full of contaminated water, there is no further contaminated water in the flow from the catchment region.

At this point the ball seals against the seat 15, and the noncontaminated rainwater flows by way of flow line 11a to a storage for primary use.

The contaminated water in the primary chamber 13 flows at a predetermined rate via the fluid line 16 and the flow regulator valve 17 to the secondary storage chamber 14 where it is retained until required.

Should the rain continue to fall, the secondary chamber 14 will eventually fill up and the contaminated rainwater will flow out through overflow 18. This will only occur after considerable rain has fallen.

In this way, a steady supply of contaminated water is provided for use when required with minimum wastage occurring.

Whilst the above has been given by way of illustrative example of the invention, many modifications and variations may be made thereto by persons skilled in the art without departing from the broad scope and ambit of the invention as herein set forth.

I claim:

1. A first flush rainwater diverter and collection system comprising primary and secondary storage chambers, a T-piece for connection in a rainwater flow path, a fall pipe connected to the T-piece and extending into the primary storage chamber, said fall pipe including a float which seals on a seat when the level of rainwater within the fall pipe reaches a preset level, the seat being located in the fall pipe and below the T-piece, a rainwater flow regulator which regulates the flow of rainwater from the primary storage chamber to the secondary storage chamber and an outlet for draw-off of rainwater as required from the secondary storage chamber.

2. A first flush rainwater diverter and collection system as claimed in claim 1 in combination with the rainwater catchment area, wherein the effective volume of the primary chamber is related to the size of the rainwater catchment area to which the system is connected as well as the degree of contamination of the catchment area so that diversion and storage of essentially only a contaminated portion of the rainwater is effected.

3. A first flush rainwater diverter and collection system as claimed in claim 2, wherein the effective volume of the primary chamber is such as to accommodate between 0.5 and 2.0 mm of rainwater over the catchment area.

4. A first flush rainwater diverter and collection system as claimed in claim 1, wherein the float comprises a ball of less density than water.

5. A first flush rainwater diverter and collection system as claimed in claim 4, wherein at least one float ball is in the fall pipe to regulate the effective volume of the primary chamber.

6. A first flush rainwater diverter and collection system as claimed in claim 1, wherein the secondary chamber is located immediately below the primary chamber.

7. A first flush rainwater diverter and collection system as claimed in claim 1, wherein the secondary chamber is between about two and three times the capacity of the primary chamber.

8. A first flush rainwater diverter and collection system as claimed in claim 1 wherein the outlet for the draw-off of rainwater comprises a tap.

* * * * *